United States Patent
Eaves (10) Patent No.: US 8,706,721 B1
(45) Date of Patent: Apr. 22, 2014

(54) METHOD TO OPTIMALLY LINK INFORMATION AND HUMANS USING HUMAN REFERRAL SIGNALS

(76) Inventor: Donald S. Eaves, Leesburg, VA (US)

(*) Notice: Subject to any disclaimer, the term of this patent is extended or adjusted under 35 U.S.C. 154(b) by 67 days.

(21) Appl. No.: 13/177,389

(22) Filed: Jul. 6, 2011

Related U.S. Application Data (63) Continuation of application No. 12/770,409, filed on Apr. 29, 2010, now abandoned.

(51) Int. Cl.
G06F 17/30 (2006.01)

(52) U.S. Cl.
USPC ............... 707/727; 707/748; 707/751

(58) Field of Classification Search
CPC ............ G06F 17/30029; G06F 17/30669; G06F 17/30702
USPC ......................... 707/727, 748–751
See application file for complete search history.

(56) References Cited

U.S. PATENT DOCUMENTS

| | | | |
|---|---|---|---|
| 6,112,202 A * | 8/2000 | Kleinberg | 1/1 |
| 2005/0060297 A1* | 3/2005 | Najork | 707/3 |
| 2012/0102047 A1* | 4/2012 | Bjork et al. | 707/748 |

* cited by examiner

Primary Examiner — Jacob F Bétit
Assistant Examiner — Amanda Willis (57) ABSTRACT

Method optimally links humans and information using correlations that detect shared interests. It then uses the probabilistic pathways established by iterating over these links to optimally connect individuals to the information they are most interested in. In so doing, this invention leverages the collective assessments of individuals whose perspectives most closely match the observer's perspectives to dramatically improve the personalized prioritization of information flows, information discovery, navigation and the efficient dissemination of information.

This invention is particularly useful in providing an objective method to organize and assess information based on human subjectivity. Since human subjectivity plays an important factor in accessing the importance of nearly all forms of information, it dramatically improves the efficiency of connecting humans to the information they personally find the most valuable.

1 Claim, 5 Drawing Sheets

METHOD TO OPTIMALLY LINK INFORMATION AND HUMANS USING HUMAN REFERRAL SIGNALS

This application claims priority to Provisional Application No. 61/309,381, filed Mar. 1, 2010

1 FIELD OF INVENTION

This invention relates generally to techniques for analyzing information based on referral signals (bookmarks, favorites, comments, ratings, etc.), which indicate varying levels of interest in informational items. More particularly, this invention relates to methods that create dynamic and optimal near and far links between humans and information that measure their influence and relevancy relative to one another. Then using these links to probabilistically connect individuals to the information that they are likely to be the most interested in. It is concerned with analyzing and linking information from the subjective perspective of humans and is independent of the explicit database link and citation structure that is typically used to link and analyze information.

2 GLOSSARY OF TERMS

While dictionary meanings are also implied b certain terms used here, the following glossary contains terms that are central to this method.

Document: is used in the general sense and may refer to any sort of information content including a photo, video, text or person identity.

Figure 1:
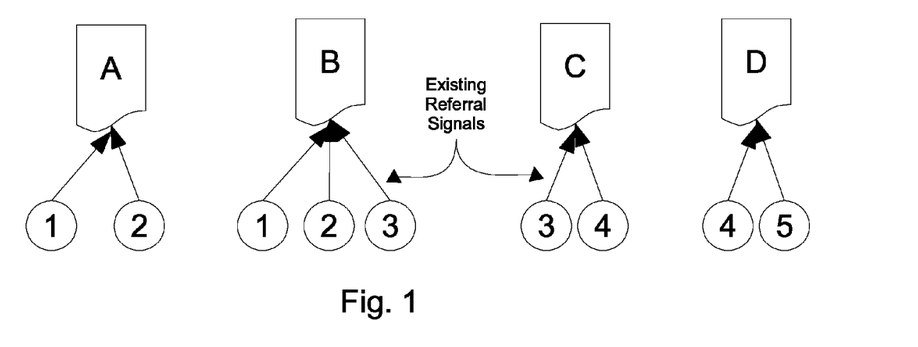
FIG. 1 depicts four documents with referral signals from 5 distinct humans. Since this invention is independent of any existing static link-structure between these documents, these documents are assumed to be unlinked.

Referral Signals: As depicted in FIG. 1, these are user interactions that explicitly reflect an interest in a document and are used by this method as signals to refer the document to other users. Examples of referral signals include: bookmarks, comments, favorites, ratings or purchases.

Figure 2:
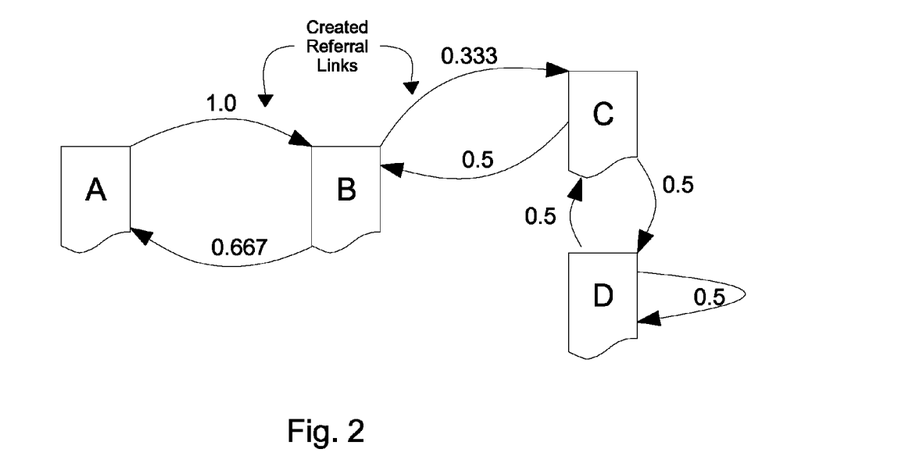
FIG. 2 depicts the initialization step; in which shared referral signals are used to create referral links between the documents forming a multigraph with the indicated edge transition probabilities (link strength). Referral links capture the direct relative relationships between inter-related documents, based on correlating shared human interests between the linked documents.

Referral Links: As depicted in FIG. 2, these are mathematical entities that are created by this method and are derived by correlating the shared Referral Signals between document lairs. Note that an two linked documents A and B are connected using two unidirectional referral links, one where document A acts as the source and the other where document B acts as the source. Also, as depicted in the transition from the structurally unlinked documents of FIG. 1 to the referral linked documents of FIG. 2, this method is adapted towards linking documents that otherwise contain no structural hyperlinks to relate them to one another, such as photo, video and audio documents.

Figure 3:
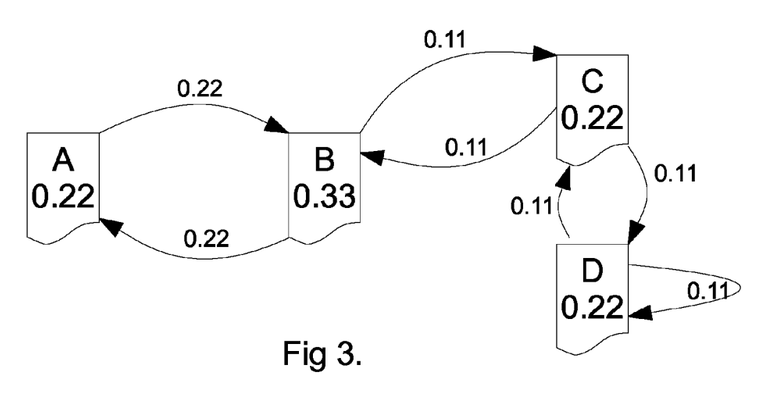
FIG. 3 depicts the steady-state probabilities (i.e., relevance score) associated with each document and the associated influence between linked documents. This distribution was arrived at when no damping is applied (damping factor=1). The edge relevance probabilities arrived at by multiplying the source relevance score by the referral link strength of FIG. 2) and steady-state document probabilities are in accordance with the present invention.

Relevance Score: As depicted in FIG. 3, these are the scores that this method computes for a set of documents based on the Referral Links that interrelate these documents. Relevance scores are used to rank documents within a result set.

3 BACKGROUND OF INVENTION

Due to the widespread deployment of high-speed network technology and significant advances in interactive web applications, there has been an overwhelming surge of data available on the Web over the last 10 years, including dramatic increases in end-user generated information, such as pictures, video, comments, etc, which were nearly non-existent a decade ago. To put things in context, in 2001 the entire Web contained 21 terabytes of information. Today, the daily growth in information is three times that number. The current underlying way of organizing this information is based on inferring document quality based on analyzing the in and outgoing hyperlinks, as well as using popularity based counting methods to infer user interest, such as the number of comments on an article. Organizing information based on link-structure is a slow, bias process since it depends on webmaster building those links, and for an accumulation of documents to reference a document before that document becomes relevant. This not only takes time, but those webmasters' interests, which may be highly influenced by the need to maximize the profits generated though online advertizing, are not representative of users in general who are far more populous and diverse. On the other-hand, popularity based methods give visibility to what is common and conceal valued unique expressions, resulting in the homogenization of information centered around popular appeal.

To make things more hostile for search engines based on link-based analysis, the quality of much of the most interesting content on the web, such as pictures, videos and literature, is not well characterized by considering link structure. This is because an intrinsic link-structure that inter-connects this category of items to one another is non-existent. For example, in contrast to html formatted web pages, which include mutual citations; pictures, videos and literature do not include internal links citing sources for the interesting internal elements of those items. Though there are sometimes surrounding links within or to the document that has embedded the artistic content, they are only tangentially related to the artistic content itself and hence are poor indicators as to its subjective quality and relevance.

Finally, more and more online activity is being conducted around communities, such as blogs and social networks— dynamic, heterogeneous environments where search engines are far less effective. Again, this is because the most successful algorithm (e.g., PageRank) were designed around the static link-structure of the internet, which was its dominant characteristic a decade ago, when content was centrally managed by webmasters and consumed by users. Within networks, users are the primary producers and evaluators of information, and hyperlinks are largely static and far less relevant.

The result is an information overload problem that drowns out artistic expressions, unique ideas and dynamic information, in favor for what has popular appeal and is static in nature. Hence, users are directed to information that has low personal relevance, making it costly to find information with the unique subjective qualities that they value most. Since the most valuable information also tends to be unique in nature, a significant amount of valuable information is lost since it is concealed from the greater part of our society.

Many technical approaches have been developed to address the problem of personalizing information. For example, search engines employ techniques to heuristically inflate the weights of certain static links to documents based on indicators gathered by observing personal behavior. For example, documents that a user has previously shown an interest in, booked marked, etc, are given a higher weight. Though this heuristic approach improves personal relevancy, it does not address the underlying problem that artistic content and unique ideas are poorly organized by these engines.

Online retailers, such as Amazon and NetFlix, have developed product recommendation systems, that recommend products to customers based on correlations with other customers that have purchased similar products. However, these systems tend to employ algorithms and heuristic techniques that are based on pair-wise matching. For example, "persons who bought item A also bought item B". Since these pair-wise techniques do not model correlations and interactions within a network of interconnected individuals and items, they can not be suitably adapted to environments like the World Wide Web. This is because the Web is a massive, highly dynamic database containing a complex network of inter-related humans and information.

Another technique used to provide users with more personal, unique and artistic information has been to form online communities. These allow individuals within these self-contained groups to share information which is much more personal and unique in nature. These include social networks, blogs, listservs, media sharing sites, etc. The general problem with these techniques is that there is poor technological assistance in determining what information, out of all the information circulated within these groups, is more relevant. Thus, as the groups become larger, each specific item of information that is distributed to the group members becomes less relevant to each specific person in the group, resulting in a similar information overload/concealment problems. Another limitation of this approach is that the information generated within these groups, does not efficiently propagate out of these groups. For example, in many cases an individual must manually forward information to another group. Thus, much of the information is again lost to the greater part of society. In the case of popular blogs, search engines provide assistance in directing individuals outside of a blog's community to the blog's content. However, the documents within small to medium sized blogs generally do not rank high enough to surface within general purpose search engines, such as Google search.

Finally, numerous heuristic techniques exist that use user behavior, such as the number of comments, to influence the ranking of documents. In general, these techniques employ popularity based algorithms. That is, if two documents are considered otherwise equally relevant, then the document with the largest number of comments ranks higher. Though variations to this basic approach exist, none of these prior-art techniques creates a unified hyperspace with an internal structure that captures the relative relationship between users and information. That is, within the hyperspace of the present invention, the relevance of any specific referral, such as a favorite, is relative to the human viewing the referral, and is also relative to the document being referred. That is, if the observer does not share the same values as the referrer, then their reference (favorite) has low relevance. Further, if the referrer is not knowledgeable of the subject matter that they are referring, then their reference also has low relevance. Since this invention is unique in its ability to objectively capture these relative relationships between humans and information, the performance of applications (e.g., search, social networks, news headline services, etc) that incorporate these principles can be greatly improved.

4 SUMMARY OF THE INVENTION

The primary objects of this invention is directed at taking advantage of user generated referral signals (such as comments, favorites, bookmarks, etc) to dynamically and optimally links information and humans through correlations that detect shared interests. Then to use the probabilistic pathways established by iterating over these links to optimally connect individuals to the information they are most interested in. Rather than using the static link/citation relationship between documents or the document's intrinsic content, to derive a probability distribution indicating the importance of a document, a method consistent with this invention determines the importance of a document by examining actual user referral signals to determine the distribution of humans that find that document important. Then from that distribution, derives the optimal link-structure that interconnects these humans and documents.

Intuitively, a document should be important, regardless of its link structure, if its highly referred (i.e., favorited) by other humans. However, not all referrals are of equal significance, they are both relative to the human observing the documents, as well as relative to the document being referred. For example, if the observer does not share any values with the referrer, then their referral has low relevance. Further, if the other documents referred by the human are of poor relative quality, then their reference also has low relevance. Thus, the importance of an informational item should be dependent not only on the number of referrals (favorites, comments, etc) it receives, but on how influential the individual making the referral is to the observer and how influential that individual is within the subject area. This implies a dual recursive definition of the influence of a human referral that is both relative to other observers and other documents (the subject matter).

Because relative referral signals are ways to direct interest to documents based on the views of referrers that are respected by or have influenced the observer in the past, informational items with a high relevancy factor, indicates that these are the items that the person who is navigating for information, performing a search or is looking for news highlights, would most likely like to direct their attention to. Put another way, the importance of an informational item is related to a dual probability that captures both the relative importance of referral signals with respect to the subject matter and the relative influence that the referrers have on the observer. This dual probability can be arrived at by simultaneously considering the following two mechanisms that users may use to find information that interests them:

1. To express the relative relationship between referral signals and subject matter this invention computes the relative probability of humans arriving at a page after considering the relative and simultaneous influence of all other associated individuals. It is assumed that every individual navigates from page to page only by looking at referral signals of the page they are presently at, for example by identifying all the favorites of all the individuals that have favorited the current page, and then picking one of those favorited items to navigate to next, and then marking it as a favorite if the observer likes it. This process ends up giving a higher probability to the documents that were favorited most by individuals that have also favorited the current document.
2. To express the relative relationship between the individuals who have created the referral signals and the observer of those signals, a human referral system is assumed, in which humans send items that they like to one another. If the observer likes the item they receive, she gives it her referral (e.g., marks it as a favorite) and sends it to another human. By computing the cumulative probability of an observer receiving an informational item from any of these other individuals interacting within the hyperspace, the relative influence of each human relative to the observer is determined.

Because this method determines document importance relative to the observer by using referral signals that indicated that the document was important to individuals that have the highest probability of both being knowledgeable in the subject area and being influential to the observer looking for information, this method of linking information and humans establishes pathways across this invention's hyperspace that optimally connect individuals to information items of interest that have the highest probability of being both uniquely relevant to the observer, and being authoritative within the subject area. Hence, some of the benefits of this technique over prior-art techniques based on a documents static link structure and/or its intrinsic content include:

It is intrinsically personal in nature

It is intrinsically dynamic since the relevance probabilities dynamically adjust based on human interest Unique and artistic expressions have equal footing with popular expressions. This is because the measure of information importance is always relative to the observer. Thus, unique and artistic expressions immediately achieve prominent ranking if that information is valued by the observers along the various pathways through the hyperspace.

In one aspect of this invention, the virtual mathematical link structure of this hyperspace is used to compute the dual steady-state probabilities of individuals arriving at documents within the hyperspace, and also of documents arriving at humans. These steady-state probabilities identify the most influential documents within each category of documents and also identify the most influential humans within each group of humans that have common interests within a subject area. This information forms the basis for the automatic categorization of documents and humans, as well as the categorized listing of results.

In another aspect of this invention, the optimal link structure is used to predict the next most likely documents to visit or humans to receive a document, based on any specific stating state. This has many applications. For example, assume that a specific human has identified a set of F favorite documents. This set of favorites is used to define an initial probability distribution among all available documents, in which a favorited document has a probability of I/F and every other document has a probability of 0. A single iteration is performed over the informational relevancy matrix and the resulting vector identifies the probability distribution of the documents that that human would be most interested in visiting next. This can, for example, be used to provide a unique and personalized prioritization of latest headlines to the observer. Or it can be used as a mechanism to search for items, such as pictures, based on a set of items that contain the subjective quality characteristics that the searcher is interested in.

In a secondary aspect of this invention, an inferior alternative relationship is used to define the links between documents and humans using simple proportions between pairs of humans and documents. These links can not be used to compute a steady-state probability distribution, since they don't define a stochastic process and hence don't converge, but they can in some cases approximate the behavior of the optimal linking structure. Thus, for completeness, a description of these alternative relationships is included.

Various aspects, applications and advantages to this invention will become apparent in view of the following description and associated figures.

6 DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

The purpose of this invention is to optimally link humans and information, using relationships that correlate similarities in interests between m humans and n informational items. Then to use these links to optimally connect humans to the information they are most interested in. In this way, this method provides an objective measure of the subjective relevance and quality characteristics of informational items relative to specific topical areas and human observers. Since a subjective assessment must be relative to the observer and other documents with related subjective attributes, an object of this invention is to define a mathematical relationship that captures this subjective relationship between humans and documents, so that it may adapt and scale as the population changes and increases in size. The construction of these subjective links of relevance that dynamically connect humans and information are depicted in FIGS. 1 through 6.

Figure 8:
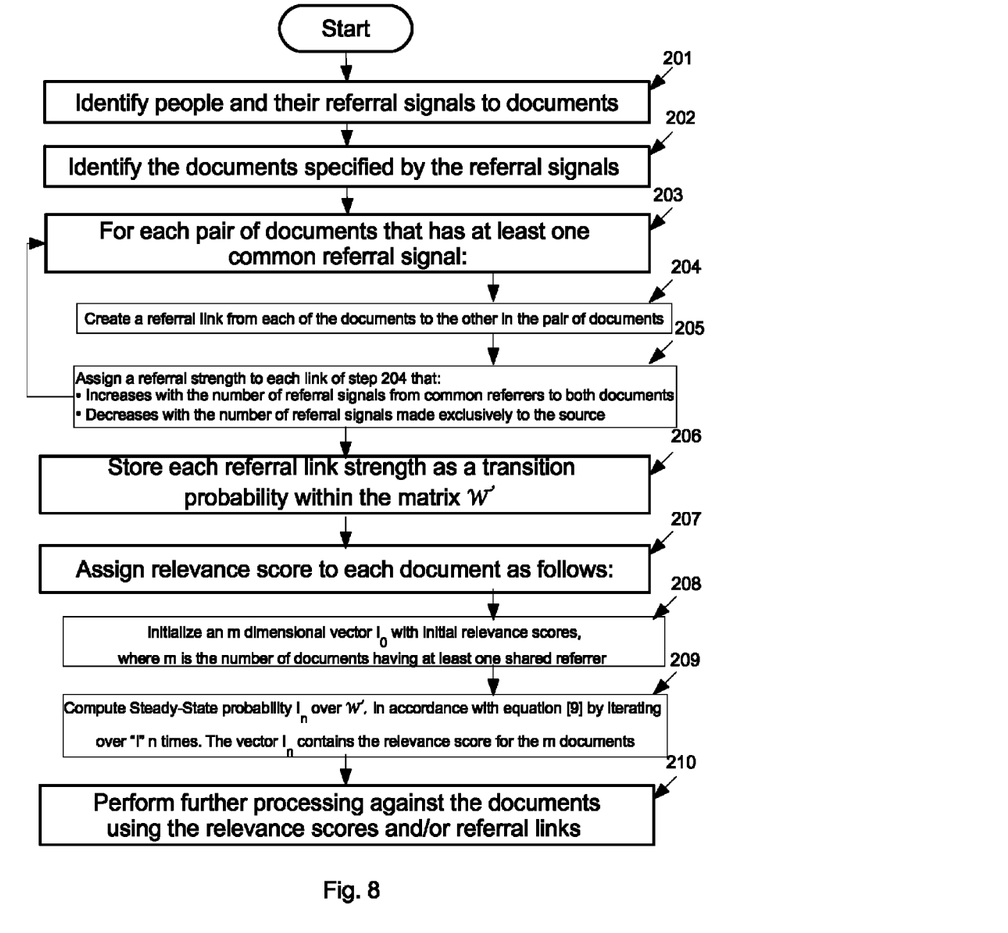
FIG. 8 is a flowchart of the overall method as described in this invention's claim.

FIG. 1 depicts 4 documents: A, B C and D, which are assumed to be unlinked (whether or not they are in fact linked documents is irrelevant to this invention). It also depicts 5 humans that have referred these documents in some way (FIG. 8, 201 and 202). For the purpose of this discussion, we will assume that the referral took the form of a favorite, though in practice there are any number of ways that a user may signal their referral/interest, including commenting, bookmarking, rating, etc. Document A is favorited by humans 1 and 2, document B is favorited by humans 1, 2 and 3. Document C by humans 3 and 4. Finally, document D is favorited by humans 4 and 5.

In one sense, the methods of this invention are superficially related to Lawrence Page's PageRank, in that both employ standard principles of Markov process to access document importance.

Within PageRank, the rank of page $p_i$ is defined by

Where d is constant damping factor, N is the number of documents and $L(p_j)$ is the number of unique links coming from page $p_j$. From this, we can see that PageRank is simply a function of the number of links coming from a page. Page Rank also employs the use of a damping factor (which is typical of Markov processes) normalized by dividing by N. That is, the algorithm is fundamentally independent of human referral signals. In fact, the purpose of PageRank is to predict human interest based on the static link structure of documents. However, the purpose of this invention is the converse. It uses actual probability distributions of human interest (as deduced from human referral signals), to derive the optimal link structure that can be followed to optimally connect people to the information that they are interested in.

The methods of this invention are also superficially similar to the well know popularity based practices, such as comment and favorite counting. However, the present method is more subtle and complex than popularity counting methods and gives far superior results. In a simple comment counting method the rank of a document with n comments is given by $$r(A)=n$$

However, again the purpose of this invention is to derive the optimal link structure between documents and humans so to find the most efficient way to connect humans to the information they are interested. The above popularity counting method simply ranks a document. It says nothing about how that document is related to other documents.

According to the primary embodiment of this invention, a hyperspace is constructed that accesses the influence of "m" humans relative to one another and the relevancy of "n" informational items (documents) relative to one another, resulting in two collections of linear equations that define the m+n dimensional hyperspace. This hyperspace is constructed by defining and solving these m+n linear equations. The construction of the informational and human subspaces is discussed below and then briefly contrasted against PageRank and popularity-based referral counting methods.

6.1 Constructing a Subspace of Optimally Linked Information

Within the present method of constructing a subspace that optimally links documents, each referral (e.g., comment, favorite, etc.) is weighed differently depending on the quality of the other documents the referrer has favorited. Further, the influence of documents that are more closely related to the document being assessed carry greater weight. Thus, this incorporates a measure of both how respected the referrer is and how knowledgeable they are with the subject matter covered by the document.

More precisely, the relative informational relevancy (I) of document A is given by the following relationship:

$$I(A)=(1-d)/N+d^*((W1)I(T1)+\ldots+(Wr)I(Tr)+(na/NA)I(A)) \quad [1]$$

where $$Wi=(1/(M1-1)+\ldots+1/(Mn-1))^*(1/Ni) \quad [2]$$

T1, ..., Tr are other documents that have been referred to by one or more of referrers of document A.

The factors W1, ..., Wr are functions that link document A to T1, ..., Tr by assigning a transition probability between each pair of related documents. These probabilities are arrived at by correlating the shared referrers between each document pair (FIG. 8, 203, 204, and 205). These functions are dependent on M1, ..., Mn and N1, ..., Nr, where for each shared referrer j between documents 'T' and A, Mj is the total number of documents referred to by referrer j and Ni is the total number of referrers associated with document "i".

d is a damping factor (typical of Markov processes), which is typically set to 0.75 and N is the total number of documents in the informational subspace. Note that dividing by N creates a simple uniform distribution of (1-d) over the N document. However, it is general knowledge that any function may be used to distribute (1-d) over N, as long as the sum of the probabilities over all N items is (1-d).

Finally, na is the total number of referrers that have "favorited" document A and no other document, while NA is the total number of referrers associated with document A.

The relative information relevancy probabilities forms a distribution over all the documents considered within the hyperspace; which could potentially be the entire web, so that the sum of all probabilities is one. The relative relevancy probability can be interpreted as the probability of a person arriving at a specific page assuming that every individual navigates from page to page only by looking at referral signals of the page they are presently at. That is, it is assumed that the human identifies all the individuals that have referred (favorited) the current document she is at, then identifies all the other documents that those users have favorited, and then picks one of these favorites to jump to next. It is also assumed that the human marks pages that they like with their referral (e.g., favorite). Using this technique, the user has the greatest probability of jumping to the document that was favorited most, by those that have favorited the current document. Hence, one ends up having the greatest probability of jumping to the most relevant, highest quality document available, based on relative referral signals.

The damping factor is a typical technique used within Markov processes. In this case, it introduces a random jump into the process. That is, the user keeps following links as described above, but every so often, as specified by the damping factor, she randomly jumps to a new page. Since the link correlation functions tend to link documents to other documents within the same category, this random jump has the effect of adding probability to the most influential documents within a category. Hence, it plays an important role during the categorization process.

The steady-state information relevancy of each page may be calculated using the standard iterative algorithms used to solve Markov processes. The solution of which corresponds to the principle eigenvector of the adjacency matrix associated with the informational relevancy multigraph as will be described in greater detail below. This eigenvector is the solution vector to the n linear equations defining the relationship between all documents within the hyperspace. This constrains n dimensions of the n+m dimensional human-informational hyperspace.

Hence, this method for defining informational relevancy is clearly more complicated and subtle then simple popularity based counting methods and is fundamentally different than PageRank since it is not based on the existing static-link structure of documents, but instead defines a hyperspace that discovers the optimal links between documents based only on a mathematical relationship that correlates shared interests. In fact, the only relationship between PageRank and the methods of this invention is that they both employ standard principles of Markov processes as the basis of their definitions.

Finally, informational relevancy only defines an n-dimensional subspace of this method's m+n dimensional human-informational hyperspace. What remains is how human influence one another. Solving the human influence subspace constrains the remaining m dimensions of the hyperspace.

Finally, these two solution vectors are not just used as simple document ranking methods, but provide a way to navigate through the human-informational hyperspace. Used in this way, they provide a means to optimally connect humans to the information that they are most interested in that does not exist in any prior-art method. Navigating through this hyperspace using this optimal link structure provides dramatic information discovery improvements over prior-art static link based approaches.

6.1.1 Matrix Notation

To describe the above equations ([1] and [2]) in matrix notation, we define I as the column vector containing the probabilities of visiting i1, . . . in. That is:

$$Ii=I(i)$$

W is an n×n stochastic adjacency matrix in which each element is defined as:

$$Wij = \begin{cases} (1/(Mj1-1)+\ldots+1/(Mjm-1))*(1/Nj), \text{ if "}i\text{"} \neq \text{"}j\text{" and there are shared referrers between documents "}j\text{" and "}i\text{"} \\ nj/Nj \text{ if "}i\text{"} = \text{"}j\text{"} \\ 0 \text{ otherwise} \end{cases} \quad [3]$$

Where:

Mjk is the total number of the documents referred to by shared-referrer k, for each shared referrer k between documents j and "i"

Nj is the total number of humans that referred to document "j"

nj are the number of referrers that refer to only document "j"

Thus, the n linear equations described in the previous section may be represented in matrix notation as follows:

$$I=d*WI+((1-d)/N)1 \quad [4]$$

Where d is a damping factor (typical of Markov processes), which is typically set to 0.75 and N is the total number of documents in the informational subspace. And 1 is the column vector of length N containing only ones.

By inspection, one can see that I must be the eigenvector for the stochastic adjacency matrix W, meaning that the relationship may be solved using the standard iteration techniques used to solve Markov problems. This computation technique will be described in a later section.

What remains is to organize the m-dimensional space of individuals and to define the transformation matrix between these two spaces, hence forming a m+n dimensional space of inter-related humans and documents.

6.2 Constructing a Subspace of Optimally Linked Humans

Within the present method of assessing the influence of humans relative to one another, this invention optimally links humans using a human influence probability function. This probability can be interpreted as the likelihood of a document arriving at a specific human assuming that every document is sent from human to human only by looking at signals indicating shared interest with the human that the document is presently at. That is, to determine where the document is sent next, one first identifies all the documents that have been favorited by a human that currently has the document, then identifies all the other humans that have favorited those same documents, and then picks one of these humans to send the document to next. It is also assumed that humans mark documents that they like with their referral (e.g., favorite). Using this technique, the document has the greatest probability of being sent to the human that has favorited the most documents in common with the current human, that is the human that has a history of sharing the most interests and values with the present human, based on shared referral signals indicating shared interests. Looked at another way, it identifies how humans influence one another and which humans share the most interests with any specific human. Thus, this incorporates a measure of both how relevant to the target human and authoritative the document is within the community of humans knowledgeable within the subject area.

More precisely, the relative human influence (H) of human B is given by the following relationship:

$$H(B)=(1-d)/M+d*((Y1)H(h1)+\ldots+(Ym)H(hm)+(xb/Xb)H(B)) \quad [5]$$

Where:

$$Yi=(1/(Z1-1)+\ldots+1/(Zn-1))*(1/Xi) \quad [6]$$

h1, . . . , hm are other humans that have also referred (e.g., favorited) one or more of the documents that human A has referred.

Further, for each shared document j between human "i" and B, let Zj be the total number of humans that have referred (favorited) document j and Xi be the total number of documents referred by human "i".

d is a damping factor, which is typically set to 0.75 and M is the total number of humans in the human influence subspace.

Finally, xb is the total number of documents that were referred (favorited) by only human B and no other human. and Xb is the total number of documents that human B referred.

The relative human influence probabilities forms a distribution over all the humans considered within the hyperspace; which could potentially be the entire human population, so that the sum of all probabilities is one. Intuitively, a human referral system is assumed in which humans send items that they like to the humans that have a history in being interested in the same category of documents. If that person likes the item, that person gives it a referral (e.g., favorites it).

The influence of each human may be calculated using the standard iterative algorithms used to solve Markov processes. The solution of which corresponds to the principle eigenvector of the adjacency matrix associated with the human influence multigraph as will be described in greater detail below. This eigenvector is the solution vector to the m linear equations defining the relationship between all humans within the hyperspace. This constrains the final m dimensions of the n+m dimensional human-informational hyperspace.

One of the benefits of this subspace is that it provides an objective and adaptive way to define near and far links between humans based on shared interests or perspectives. This has significant implications with regard to the development of advanced human networking applications.

6.2.1 Matrix Notation

To describe the human influence subspace in matrix notation, we define the column vector H as containing the influence quotients of humans h1, . . . hm. That is: Hi=H(hi)

Also, the m×m stochastic adjacency matrix Y in which each element is defined as:

$$Yij = \begin{cases} (1/(Zj1-1)+\ldots+1/(Zjn-1))*(1/Xj), \text{ if "}i\text{"} \neq \text{"}j\text{" and there} \\ \text{are shared documents between humans "}j\text{" and "}i\text{"} \\ xj/Xj \text{ if "}i\text{"} = \text{"}j\text{" and } Xj \neq 0 \\ 0 \text{ otherwise} \end{cases} \quad [7]$$

Where for each shared document k between humans j and "i":
Zjk is the total number of humans that have favorited document k
Xj be the total number of documents favorited by human "j"
xj is the number of documents favorited only by human "j"
Equations [5] and [6] in the previous section may be represented in matrix notation as follows:

$$H=d*YH+((1-d)/M)1 \quad [8]$$

Also, d is a damping factor (typical of Markov processes), which is typically set to 0.75 and M is the total number of humans in the human influence subspace.

Finally, 1 is the column vector of length m containing only ones.

Hence, by inspection H must be the eigenvector for the stochastic adjacency matrix Y.

6.3 Alternative Relationships

There are other relationships that could be used to link humans and documents. For example, one could just look at the simple proportion of shared referrers between documents. Though it will be shown that this is a statistically invalid relationship that does not lead to the observed steady-state probability distribution, this alternative may, in some cases, approximate the results of the primary aspects of this invention. Hence, it is documented here for completeness.

6.3.1 Linking Documents by Simple Proportions

Within the method of this secondary aspect of this invention, documents are linked by simple proportions. That is, the transition weight between documents is only dependent on the proportion of shared referrers between the two documents.

More precisely, the proportional informational relevancy (I') of document A is given by the following relationship:

$$I'(A)=(1-d)/N+d*((m1/N1)I'(T1)+\ldots+(mr/Nr)I'(Tr)+(na/NA)I'(A))$$

where
mi is the total number of shared referrers between document "i" and A
Ni is the total number of referrers associated with document "i"
na is the total number of referrers that have "favorited" document A and no other document
NA is the total number of referrers associated with document A.

In the simple case of FIG. 1, in which there is no overlap within the relationships between documents, the above definition has the same results as the optimal link structure. However, in general there will be overlap, and then the sum of the outgoing links from the affected documents will no longer be unity. Meaning that the transition matrix will no longer be stochastic and hence the relationship is not statistically valid. Though this relationship is inferior to the relationship of the primary aspect of this invention, it could in some cases, be used as a simple approximation to the optimal linking relationship between documents.

To see that the transition matrix is no longer stochastic, assume FIG. 1 had another document C' which was also referred to by humans 3 and 4. Then (assuming d=1) the outgoing links from B would be (refer to FIG. 2 to see the outgoing links of B without C'):

$$B\text{->}A=2/3$$

$$B\text{->}C=1/3$$

$$B\text{->}C'=1/3$$

From which we can see that the sum of outgoing links from B is now 1⅓ instead of unity, which is required for steady-state convergence and the statistically sound accumulation of probabilities.

6.3.2 Linking Humans by Simple Proportions

Within the method of this secondary aspect of this invention, humans are linked by simple proportions. That is, the transition probability between humans is only dependent on the proportion of shared documents between the two humans.

More precisely, the proportional human influence (H') of human B is given by the following relationship:

$$H'(B)=(1-d)/M+d*((y1/X1)H'(h1)+\ldots+(ym/Xm)H'(hm)+(fa/FA)H'(B))$$

Where:
yi is the total number of documents referred to by both human "i" and human B
Xi be the total number of documents referred by human "i".
d is a damping factor, which is typically set to 0.75
M is the total number of humans under consideration
fa is the total number of documents that were referred (favorited) by only human B and no other human
FA is the total number of documents that human B referred.

This relationship suffers the same statistical problem as with the proportional linking of documents, in that the transition matrix is not stochastic, and hence is not statistically sound. Though this relationship is significantly inferior to the relationship of the primary aspect of this invention, it could possibly be used as a simple approximation to the optimal linking relationship between humans.

For the aforementioned reasons, the approximate linking of humans and information is only a secondary aspect of this invention, and will not be described any further, outside of being referenced by the claims of this invention.

6.4 Deriving the Informational Relevancy Subspace

In order to illustrate the present method of optimally linking documents, consider the simple information relevancy multigraph shown in FIG. 2, that was derived using the referral signals associated with the unlinked documents of FIG. 1. The edge transition probabilities are defined by equation [2] above, with a damping factor of 1.

Document A has two referrers, 1 and 2. The only other document that includes any of these referrers is Document B. Thus each of these referrers has referred two documents and there are a total of 4 referrers associated with document B. Thus:

$$I(A)=(Wb)I(B), \text{ where } Wb=(1/(2-1)+1/(2-1))*1/3=2/3$$

$$I(A)=2/3*I(B)$$

FIG. 2 contains the remain edge transition factors, which were computed as described above. For brevity purposes, rather than redundantly going through the process of computing each factor in this description, the factors from FIG. 2 will be used directly.

Document B has 4 referrers, 1, 2, 3 and 4. Some subset of which is associated with documents A and C. Thus:

$$I(B)=Wa*I(A)+Wc*I(C)$$

By calculating Wi according to the aforementioned formula, we get:

$$I(B)=1*I(A)+1/2I(C)$$

Similarly, for Document C:

$$I(C)=1/3*I(B)+1/2I(D)$$

Document D includes referrers 4 and 5. While referrer 4 has also referred documents B and C, referrer 5 has not referred any other document. Thus:

$$I(D)=1/2I(C)+nd/ND*I(D),$$

where nd is the total number of unshared referrers which is 1 and ND is the total number of referrers associated with D, which is 2. Thus:

$$I(D)=1/2I(C)+1/2I(D)$$

Solving these 4 linear equations, we arrive at:

$$I(C)=I(A)=I(D)=2/3*I(B)$$

Since $$I(A)+I(B)+I(C)+I(D)=1$$

One arrives at: I(B)=3/9, I(A)=2/9, I(C)=2/9, I(D)=2/9

Which is equivalent to the probability distribution of referrers over the 4 documents, confirming that the optimal link structure, correctly leads to the input probability distribution.

Figure 4:
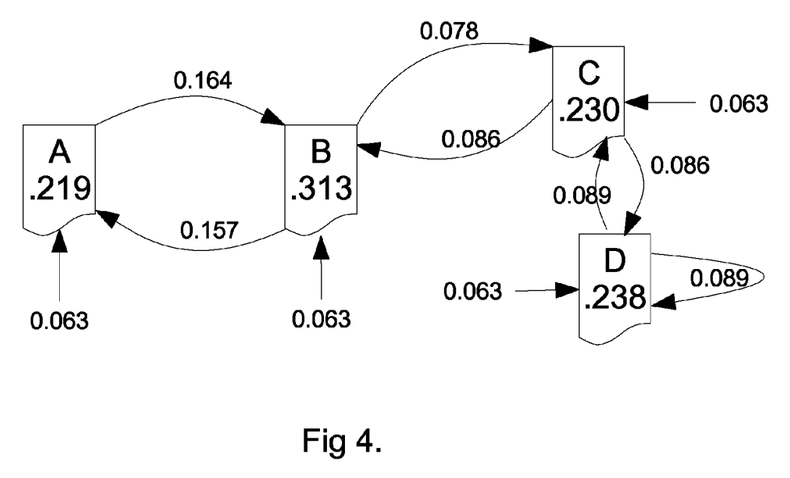
FIG. 4 depicts the steady-state probability distribution for the information subspace when a damping factor of 0.75 is used.

If we assume a damping factor of 0.75, which corresponds to a probability of 0.25 that the human will randomly jump to one of the 4 documents instead of following a link, then the 4 linear equations relating each of the documents becomes:

$$I(A)=1/16+3/4*2/3*I(B)=1/16+1/2I(B)=0.219$$

$$I(B)=1/16+3/4*(I(A)+1/2I(C))=1/16+3/4I(A)+3/8*I(C) = 0.313$$

$$I(C)=1/16+3/4*(1/3*I(B)+1/2I(D))=1/16+1/4I(B)+3/8*I(D)=0.230$$

$$I(D)=1/16+3/4*(1/2I(C)+1/2I(D))=1/16+3/8*I(C)+3/8*I(D)=0.238$$

FIG. 4 depicts the steady-state probabilities for the 4 document hyperspace when a damping factor of 0.75 is used.

6.5 Deriving the Human Influence Subspace

Figure 5:
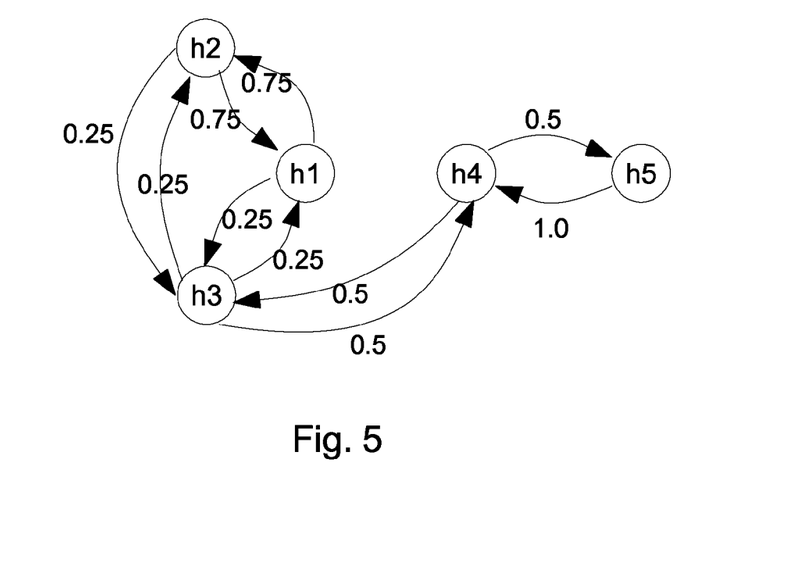
FIG. 5 depicts the initialization step, in which shared referral signals are used to link humans to one another, forming a multigraph with the indicated edge transition probabilities.

In order to illustrate the present method of optimally linking humans, consider the simple human influence multigraph shown in FIG. 5, that was derived using the referral signals associated with the unlinked documents of FIG. 1, based on the edge transition probabilities defined by equation [6]. For descriptive purposes, a damping factor of 1.0 is used. To avoid confusion within this description, humans 1 through 5 will be referred to as humans h1 through h5.

Human h1 has referred two document, A and B. Humans h2 and h3 have also referred one or more of these documents. Human h2 has two shared documents with human h1, documents A and B, and the total number of referrers to document "A" is 2 and the total number of referrers to document B is 3. While human h3 has only one shared document with human h1, which is document B, which has 3 referrers.

Thus:

$$H(h1)=(Y2)H(h2)+(Y3)H(h3),$$

where:

$$Y2=(1/(2-1)+1/(3-1))*1/2=0.75$$

and $$Y3=(1/(3-1))*1/2=0.25$$

So from the above (and by inspecting FIG. 5) we see that:

$$H(h1)=0.75H(h2)+0.25H(h3)$$

H(h2) through H(h5) have been similarly computed and their edge transition probabilities are in FIG. 5. Expressing the sum of the incoming links for each of the remaining node in FIG. 5 as a set of linear equations results in:

$$H(h2)=0.75H(h1)+0.25H(h3)$$

$$H(h3)=0.25H(h1)+0.25H(h2)+0.5H(h4)$$

$$H(h4)=0.5H(h3)+H(h5)$$

$$H(h5)=0.5H(h4)$$

Figure 6:
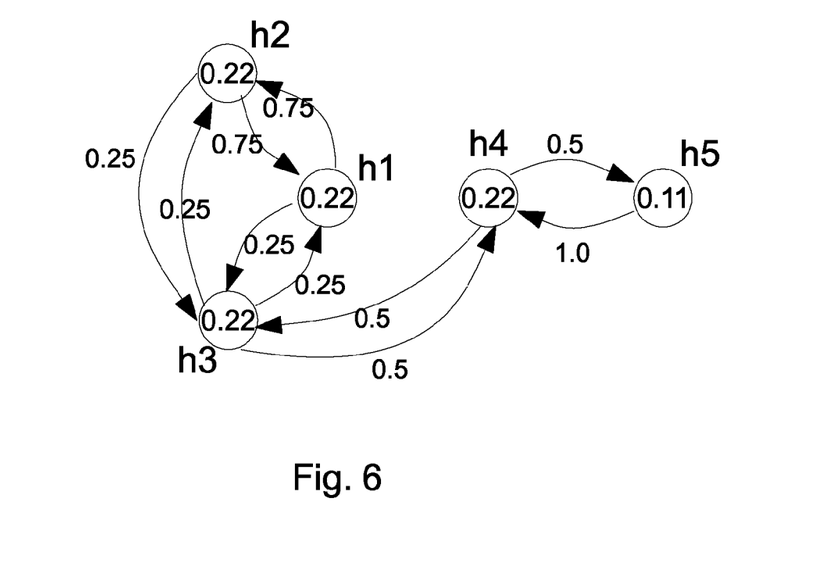
FIG. 6 depicts the steady-state probability distribution for the human influence subspace when a damping factor of 1.0 is used.

The solution to these 5 linear equations is the steady-state probability of a document arriving at any one of these humans when a damping factor of 1 is used. The solution is:

$$H(h1)=0.22,H(h2)=0.22,H(h3)=0.22,H(h4)=0.22,H(h5)=0.11$$

FIG. 6 depicts the steady-state probabilities for the 5 human subspace when a damping factor of 1.0 is used. Normally a damping factor of 0.75 is used, however a value of 1.0 was chosen to simplify this description.

6.5.1 Computing the Steady-State Probabilities

As described above, equations [4] and [8] identify the steady-state probabilities within the human-informational hyperspace.

$$I=d*WI+((1-d)/N)1 \qquad [4]$$

and $$H=d*YH+((1-d)/M)1 \qquad [8]$$

Figure 7:
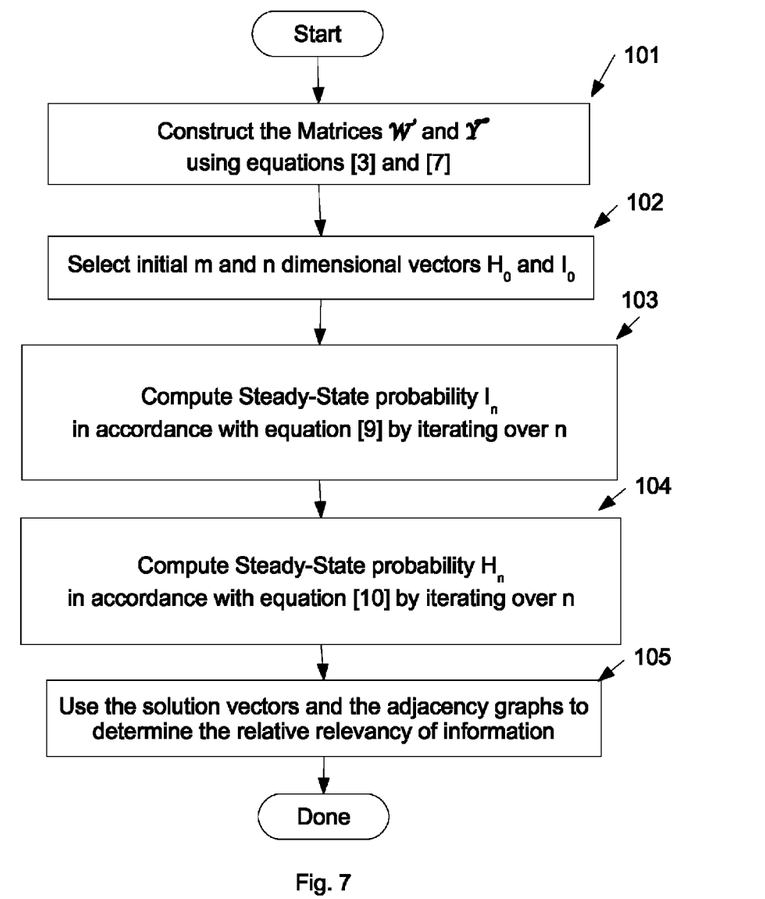
FIG. 7 is a flowchart of one implementation of this invention depicting a standard Markov iteration solution used to arrive at the steady-state probabilities.

Since they both define Markov processes, they can be computed using the standard iterative process depicted in FIG. 7.

The first step (FIG. 7, 101; FIG. 8, 206) is to construct the edge transition probabilities matrices for the informational (W) and human (Y) subspaces. This is done using equations [3] and [7], respectively. That is:

$$Wij = \begin{cases} (1/(Mj1-1)+\ldots+1/(Mjm-1))*(1/Nj), \text{ if "}i\text{"} \neq \text{"}j\text{" and there are shared referrers between documents "}j\text{" and "}i\text{"} \\ nj/Nj \text{ if "}i\text{"} = \text{"}j\text{"} \\ 0 \text{ otherwise} \end{cases} \qquad [3]$$

$$Y_{ij} = \begin{cases} (1/(Zj1-1) + \ldots + 1/(Zjn-1)) * (1/Xj), \text{ if } "i" \neq "j" \text{ and there} \\ \text{are shared documents between humans } "j" \text{ and } "i" \\ xj/Xj \text{ if } "i" = "j" \\ 0 \text{ otherwise} \end{cases} \quad [7]$$

The next step (102) is to compute the initial state probability distributions for $I_0$ and $H_0$. For $I_0$, the weighted distribution of referrers among documents is used, and for $H_0$ the weighted distribution of documents among humans is used. That is:

$I_{0i}$=(number of referrers for document $i$)/(total number of document referrers)

and $H_{0i}$=(number of documents referred by human $i$)/(total number of human references)

In the next step (FIG. 7, 103; FIG. 8, 207 and 208) the steady state probability distribution for the Informational subspace is computed. This is done using a simple iteration process over the following equation:

$$I_n = d*WI_{n-1} + ((1-d)/N)1 \quad [9]$$

where n is iterated from 1 to some number x until the difference between $I_n$ and $I_{n-1}$ is within the desired precision.

In the next step (FIG. 7, 104; FIG. 8, 209) the steady state probability distribution for the human-influence is computed. This is done using a simple iteration process over the following equation:

$$H_n = d*YH_{n-1} + ((1-d)/N)1 \quad [10]$$

where n is iterated from 1 to some number x until the difference between $H_n$ and $H_{n-1}$ is within the desired precision.

Once computed, the resulting steady-state probabilities can be used within various information discovery applications to dramatically improve results over prior-art techniques (FIG. 7, 105; FIG. 8, 210).

6.5.2 Searching for and Recommending Information

This invention provides various ways of navigating and discovering information. For example, the optimal link structure can be used to predict the most likely documents that a human would like to receive, or the closest match to a search query that is composed of a list of documents that contain the characteristics that a user is looking for. For example, assume that a specific human has identified a set of F favorite documents, or is performing a search based on F documents that contain the subjective characteristics he is interested in. This set of documents is used to define an initial probability distribution among all available documents, in which a favorited document has a probability of 1/F and every other document has a probability of 0. By multiplying the transition matrix by the vector containing the initial probability distribution one obtains the probability distribution of the documents most likely to be visited next. That is, the set of documents that the user would most likely be interested in based on their past behavior or their current search interests.

This has application not only within search, but in personalizing the information flow to a human. For example, within a news site, each human would be presented with the headlines and the categories of information that are most relevant to them, instead of being selected by the webmasters of the news site. This would allow for dramatic improvements in the efficient use of screen real estate, since it would optimize the view on a per human basis, eliminating the wasting screen real estate on information that individual users are not interested in, and populating it with information they are predicted to be most interested in. When the cumulative effects of this inefficiency are considered, the improvements provided by applying this principle could be enormous.

More precisely, let L be the column vector containing the initial probability distribution based on a set of favorites and let R be the column vector containing the result sets probability distribution, then equation [4] becomes:

$$R = d*WL + ((1-d)/N)1 \quad [11]$$

where $L_i = 1/F$ if document "$i$" is a favorite (or part of the search) and 0 otherwise.

R represents the probability distribution of the documents that the user is most likely to find relevant and important.

Similarly, assume one has a document that has been favorited by G humans, and one would like to know what humans would be most interested in seeing it next. To find the solution one defines G as follows:

$G_i = 1/G$ if human "$i$" has favorited the document and 0 otherwise.

Then, reformulating equation [8] the result set probability distribution would be computed as follows:

$$S = d*YG + ((1-d)/M)1 \quad [12]$$

S represents the probability distribution of the humans that would most likely find the specified document both relevant and important.

6.5.3 Ranking and Categorizing Results

When a damping factor (typically 0.75) is used, the steady-state probabilities have the property of accumulating more around the most central documents or humans within a category. Thus, by using this information, a categorization algorithm can be constructed that determines the optimal categorization of information. For example, consider FIG. 4, it shows that B is the most influential document (0.313). This makes it is the most influential document within the most influential category of the hyperspace. The next most influential document is D (0.238). It is either part B's category or the most influential document within a new category. Since there are no direct links between B and D, it is not part of B's category. Thus it is identifying the second most influential category. By inspection one can see that document D is the most distant document from document B, in that it shares no referrers with it. Thus, by simply rank ordering results and recursively applying this principle, one effectively categorizes information and humans.

Thus, the steady-state probabilities may be used to categorize information and to rank results (such as search results) from the perspective of the most influential documents/individuals within the various subject areas. The categorization of results allows information to be ordered, with the most influential category of information first. The benefit of grouping the results is that if the query is ambiguous, in that it could apply to several subject areas, one can skip over the incorrect subject area of results and move to one that appears to be in the correct subject area.

6.5.4 Possible Uses for Human-Informational Hyperspace

By processing the optimally linked documents and humans within the human-informational hyperspace of this invention, one can significantly improve the efficiencies associated with connecting humans to the information they are most interested in. For example, the following methods can be used to optimally connect humans to information 1. Given any specific human J, identify the most relevant documents to forward them, based on their historic interests.
2. Assume one wants to search for documents that have similar or better subjective quality characteristics to a set of documents, identify those documents and rank order them based on how well they match the model set of documents. This can be accomplished by rank ordering documents based on strongest cumulative linking to the source set of document.
3. Given a set of documents, organize these documents into the most influential categories of documents and find the most influential document or documents from each category.
4. Given a document K, identify the humans would be most interested in it.
5. Identify the group of humans that have similar interests to a given human.
6. Given a set of humans, organize these humans into the most influential groups of humans around shared interests, and find the most influential humans within each group.
7. Identify the most influential humans within these groups.
8. Given a specific set of keywords, identify the documents with the highest subjective quality rankings that match those keywords.
9. Refine the above search, by adding a set of documents that contain the subjective quality characteristics that the searcher values.

The above are examples of the type of optimizations that can be achieved by applying the principles of this invention. It will be clear to one skilled in the art that the above embodiments may be altered in many ways without departing from the scope of the invention. Accordingly, the scope of the invention should be determined by the following claims and their legal equivalents.

What is claimed:

1. A computer implementation method of creating referral links between documents and scoring a plurality of documents based on these created referral links, comprising:
   identifying a plurality of people who have all collected referral signals to documents and identifying those referral signals;
   identifying the plurality of documents identified by the referral signals of the plurality of people;
   creating referral links between source and sink documents from among the plurality of documents, where the link strength between the source and sink documents is based on the number of referral signals from common referrers to both these documents,
   wherein when there is only an increase in the number of referral signals made by referrers exclusively to the source document, then the link strength from the source document to the sink document decreases; and
   wherein when there is only an increase in the number of referral signals from common referrers to both the source and the sink documents, then the referral link strength from the source document to the sink document increases;
   assigning a relevance score to each sink document, based at least in part on the relevance score of each source document with a non-zero referral link to each sink document and the referral link strength from the source documents to the sink documents; and
   processing these documents according to the referral link strengths or the relevance score associated with each document.

\* \* \* \* \*